United States Patent [19]

Yamagishi et al.

[11] Patent Number: 5,769,331
[45] Date of Patent: Jun. 23, 1998

[54] METHOD AND APPARATUS FOR RECYCLING EMPTY ALUMINUM CANS

[75] Inventors: Yoshinao Yamagishi; Kazuyoshi Arikata; Takao Kurozumi; Toshio Kondo, all of Kanagawa, Japan

[73] Assignee: Nippon Chuzo Kabushiki Kaisha, Kawasaki, Japan

[21] Appl. No.: 750,575

[22] PCT Filed: Jul. 5, 1995

[86] PCT No.: PCT/JP95/01338

§ 371 Date: Dec. 11, 1996

§ 102(e) Date: Dec. 11, 1996

[87] PCT Pub. No.: WO96/01332

PCT Pub. Date: Jan. 18, 1996

[30]     Foreign Application Priority Data

Jul. 5, 1994   [JP]   Japan ................................. 6-153213

[51] Int. Cl.$^6$ .................................................. B02C 19/12
[52] U.S. Cl. ............................... 241/5; 241/23; 241/29; 241/65; 241/152.2; 241/275
[58] Field of Search ................................. 241/23, 3, 275, 241/65, 101.2, 99, 5, DIG. 38, 29, 152.2

[56]           References Cited

U.S. PATENT DOCUMENTS 4,044,459  8/1977  Burlingame .

FOREIGN PATENT DOCUMENTS

| 3617589 | 1/1991 | Australia . |
|---|---|---|
| 51-52925 | 5/1976 | Japan . |
| 55-34853 | 9/1980 | Japan . |
| 61-37934 | 2/1986 | Japan . |
| 2-53494 | 11/1990 | Japan . |

OTHER PUBLICATIONS

Japanese Patent Application Laid–Open No. 2–160473.
Japanese Patent Application Laid–Open No. 2–83167.
Japanese Patent Application Laid–Open No. 5–67687.
Japanese Patent Application Laid–Open No. 57–42411.

*Primary Examiner*—Mark Rosenbaum
*Attorney, Agent, or Firm*—Ladas & Parry

[57]         ABSTRACT

A recycling method and apparatus that almost completely removes paints and pigments on the surfaces of empty aluminum cans to recover aluminum with very few impurities. Pressed blocks of aluminum cans are shredded into small aluminum pieces (a) by shredding means (1, 2, and 3), and foreign matter mixed in the aggregate of aluminum pieces obtained is removed. The aggregate of small aluminum pieces (a) free from foreign matter is agitated by a paint removing device (20) using a rotating body (36) that rotates at a high speed, in order to remove paints and pigments coated on the surfaces of the aluminum pieces (a) employing frictional force caused by the difference in speed as well as adhesion. The small aluminum pieces (a) free from paints and pigments are molded again into aluminum compacts (b) by a compression molding machine.

8 Claims, 11 Drawing Sheets

METHOD AND APPARATUS FOR RECYCLING EMPTY ALUMINUM CANS

FIELD OF THE INVENTION

The present invention relates to a method and apparatus for recycling empty aluminum cans that have been used as containers for drinks as new aluminum cans, an aluminum source, or steel making deoxidizers or additives.

BACKGROUND OF THE INVENTION

In recent years, aluminum cans have been widely used as containers for beer or carbonated drinks, and a large number of empty used cans have been abandoned, leading to an environment problem. In addition, refining aluminum ores requires a large amount of electric energy as well as the discharge of $CO_2$ gas. Recycling empty aluminum cans is thus very important because it contributes to energy saving, the preservation of underground resources, and the protection of global environment.

Empty aluminum cans abandoned by general homes with other wastes are separated from garbages and steel cans, and then molded into pressed blocks of a fixed size by recycling companies. To reuse pressed blocks, the following two processing methods are used.

One of them is to melt the pressed blocks directly or after pre-processing such as cutting, roasting, or press molding and then to cast them into molds to obtain ingots. The other is to cut aluminum cans into pieces of an appropriate size, to roast them directly or after further cutting, and then to press mold them so that they will have an appropriate size, as disclosed in Japanese Patent Publication No. 5-67687. Materials obtained by such processing are reused as new aluminum cans or steel making deoxidizers.

The above conventional processing methods for manufacturing recycling aluminum materials from pressed blocks have the following problems arising from the mixture of paints or pigments applied to the surface of the cans due to the direct recycling of collected empty cans.

As reported in "Effects of paints in the recycling of empty used cans" in R. D Kobe Seiko Technical Report/Vol. 43, No. 2 (1993), conventional melting methods have the following problems:

1. Oxidation losses increase during melting unless the paints are completely removed.
2. Ti from $TiO_2$ used as pigments is mixed into melts during melting.

This literature indicates that the above decrease in yields can be minimized by burning at high temperatures (798° K or higher) and that the mixture of Ti can be prevented by capturing $TiO_2$ in slag to remove it. It, however, also points out metal losses caused by melting and the need of new methods for removing paints from empty cans during pre-processing and removing oxides from aluminum during melting.

The inventions in Japanese Patent Publication No. 2-53494 and Japanese Patent Application Laid-Open No. 2-160473 are disclosed as such processing methods. FIGS. 12 and 13 show the configurations of these inventions.

In FIG. 12, reference numeral 1 designates a crusher with a screen 1a; 2 is an exhauster; 3 is a cyclone; 4 is a back filter; and 5 is a sieve. Reference numeral 6 denotes a magnetic separator; 7 is a tank; 8 is a thermal treatment device; 8a is a burner; and 9 is an impact granulating machine.

In the invention of the configuration shown in FIG. 12, the crusher 1 crushes empty cans into scales, the exhauster 2 supplies air to the cyclone 3, the back filter 4 and the sieve 5 operate to remove impurities, and the magnetic separator 6 operates to remove iron pieces. The heat treatment device 8 further burns and removes synthetic resins, and the impact granulating machine 9 applies striking and twisting impacts to release and remove residual metallic substances contained in residual carbides and paints in order to carry out granulation.

In FIG. 13, reference numeral 1 indicates a pot drum; 2 is a shot section; 3 is a discharge port; 4 is a screw conveyor; 5 is a bucket conveyor; 6 is a concentrator; 7 is an opening and closing device. In this apparatus, a crusher cuts aluminum chips into small pieces 10 to 60 mm in size, which are then heated at about 150° C. to burn and remove attachment such as vinyl. After burning and removing attachment, the small pieces obtained from the aluminum chips are fed into the drum 1, the door 7 of which is then closed, and the pieces are rotated and agitated inside the drum while an impeller that rotates at a high speed inside the shot section 2 shoots shot balls against the pieces.

After collision, the shot balls fall from the discharge port 3, and are returned to the inside of the shot section 2 by the screw conveyor 4 and the bucket conveyor 5, thereby continuing shooting over a fixed period of time. The impact and frictional force effected by the shooting of the shot balls serves to release and remove paints from the surfaces of the small aluminum pieces. The removing method in Japanese Patent Publication No. 2-53494 shown in FIG. 12, however, cannot completely remove aluminum oxides from the surfaces of the small aluminum pieces. In addition, residual carbides or pigments cannot be completely removed.

Experiment conducted by the inventors indicate that when such small pieces are granulated, grains covered with oxides or foreign matter accumulate in several layers on other grains and that these oxides and foreign matter act as heat insulating materials to delay the increase in temperature and to hinder melting. In addition, the area that contacts air is gradually oxidized, resulting in a significant decrease in the recovery rate of aluminum.

In the method shown in FIG. 13, small aluminum pieces are processed and hardened by shot peening effects. If the small pieces are fed into melts for melting, they surface over the melts due to the surface tension thereof, and oxidation losses increase. Consequently, this method generally includes a granulation process, but processed and hardened aluminum pieces cannot be granulated easily due to their low workability. The method in the invention of Japanese Patent Application Laid-Open No. 2-160473 is limited in its processing performance owing to its batch processing, so it is not suitable to continuous mass processing.

Another film removal method similar to the method shown in FIG. 13 is the one described in Japanese Patent Application Laid-Open No. 2-83167. In this film removing method, used aluminum cans are cut into small squares 5 to 40 m/m in size, an appropriate amount of small pieces are agitated while metal grains 0.2 to 0.8 m/m in size are shot against the small pieces at a shooting speed of 55 seconds, thereby removing the films applied to the surfaces of the small pieces.

This method is limited in its processing performance as in the invention of Japanese Patent Application Laid-Open No. 2-160473, and cannot be industrially implemented easily. In particular, this application cites in line 3 of its lower right column and below as a conventional example, a method of cutting aluminum cans into small pieces, burning them, and then agitating and rubbing them together in order to remove films. This conventional example, however, uses a general agitator, so the contraction of grains is insufficient. Consequently, it results in degraded recycled cans, which is a critical disadvantage. All these conventional methods and devices thus have some problems.

BRIEF SUMMARY OF THE INVENTION

This invention is adapted to solve the above conventional problems, and the objective of this invention is to provide a processing method capable of almost completely removing paints and pigments applied to the surfaces of cans to enable the reuse of aluminum without impurities.

An aluminum can recycling method according to a first aspect of this invention comprises:

a first step for cutting empty aluminum cans into small pieces of 10 mm squares or less and removing foreign matter mixed in the aggregate of these small pieces;

a second step for heating the aggregate of the small aluminum pieces processed during the first step at a heating temperature lower than the melting point in order to burn the inflammable foreign matter; and a third step for feeding the aggregate of the small aluminum pieces processed during the second step into an agitating vessel including both a rotating drum in a form of a container surrounded by a wall and a stationary annular rack located above and around the rotating drum, for rotating the rotating drum at a high speed in order to cause friction between small aluminum pieces accumulated by centrifugal force in the respective corners of both the rotating drum and the annular rack and flowing small aluminum pieces, and for peeling paints and oxides on the surfaces of the small aluminum pieces by using the friction.

According to an aluminum can recycling method in accordance with a second aspect of this invention, in the first step, the small aluminum pieces are cut into 3 to 6 mm squares.

According to an aluminum can recycling method in accordance with a third aspect of this invention, in the third step, plural units of the agitating vessel are connected in order to repeat the third step a plurality of times.

According to an aluminum can recycling method in accordance with a fourth aspect of this invention, in the third step, friction media are mixed in the aggregate of small aluminum pieces.

An aluminum can recycling method according to a fifth aspect of this invention includes a fourth step for compressing the aggregate of small aluminum pieces in order to mold the same into a metal mass.

According to an aluminum can recycling method in accordance with a sixth aspect of this invention, in the fourth step, the aggregate of small aluminum pieces is compressed at a pressure of at least 4 ton/cm$^2$ to mold the same into a metal mass.

An aluminum can recycling apparatus according to a seventh aspect of this invention comprises:

a shredding means having a function of cutting empty aluminum cans into small pieces of 10 mm squares or less and removing the foreign matter mixed in the aggregate of these small pieces;

a heating means for heating the aggregate of small aluminum pieces processed by the shredding means at a heating temperature lower than the melting point in order to burn inflammable foreign matter; and a paint removing device for feeding the aggregate of the small aluminum pieces processed by the shredding means into an agitating vessel including both a rotating drum in a form of a container surrounded by a wall and a stationary annular rack located above and around the rotating drum, for rotating the rotating drum at a high speed in order to cause friction between small aluminum pieces accumulated by centrifugal force in the respective corners of both the rotating drum and the annular rack and flowing small aluminum pieces, and for peeling paints and oxides on the surfaces of the small aluminum pieces by using the friction.

According to a recycling apparatus in accordance with an eighth aspect of this invention, the seventh aspect further includes a compressing means for compressing the aggregate of small aluminum pieces processed by the paint removing device in order to mold the same into a metal mass.

The operations and effects of the first to fourth steps included in the above-mentioned first to eighth aspects of this invention are as follows.

A. First step

The main purpose of the first step is to allow the subsequent steps to be executed effectively.

During the first step, a shredder is used to shred the pressed blocks of empty aluminum cans, which are finally cut into small pieces, from which foreign matter is removed. In this manner, adequate selection of the size of small aluminum pieces finally obtained after cutting serves to provide aluminum compacts of a higher specific gravity.

Dust explosion may occur if aluminum fines are generated during the processing steps. Therefore, every effort must thus be made to prevent the generation of fines. With the mesh size of a sieve according to this invention, the generation of fines of less than 0.5 mm in particle size is reduced and most of the fines of 0.5 mm or less are substances consisting of such components other than aluminum. For the above reason, the danger of dust explosion due to aluminum fines is eliminated.

B. Second step

The objective and effect of setting this step after the shredding in the first step are to recover the components of aluminum processed and hardened due to pressing, crushing, or cutting in order to increase the specific gravity of products obtained after subsequent molding. If this roasting step is carried out before the first step, the components of aluminum processed and hardened by shearing stress will not recover.

If the second step is omitted, resultant compacts cannot be deformed easily due to the components of aluminum processed and hardened owing to pressing, crushing, or cutting, resulting in a reduced specific gravity of such compacts after pressing. Consequently, pressed products are likely to be damaged or broken, so special attention must be paid during their transportation. Small aluminum pieces may also surface over melts, leading to an increase in oxidation losses. The presence of the roasting during the second step significantly affects the processing conditions and effects of subsequent third and fourth steps. Carrying out the first and second steps in this order serves to reduce the number of operations to be executed during the third step in order to simplify the third step.

C. Third step

The aggregate of small aluminum pieces cut and processed during the second step is subjected to the difference in speed between the inner and outer circumferences as well as centrifugal force. The interaction of the above action and pressing force applied to the small pieces serves to peel foreign matter from the surfaces of the small aluminum pieces, thereby effectively removing it. In addition, in the mechanical removing device in the third step, friction media are mixed in the aggregate of small aluminum pieces for improving the removal efficiency. If the friction media of magnetic substance are used, the small aluminum pieces can be separated from the friction media by using magnetic separation. The friction media return to their original position so as to be reused to remove paints.

If the small aluminum pieces have been roasted during the second step, only several repeated operations enable residual $TiO_2$ to be almost completely removed during the third step even if friction media are not used. It has conventionally been difficult to recycle used aluminum cans as new ones because Ti reduced during melting process adverse effects during sheet rolling and can processing. The process according to this invention, however, enables recycling. In addition, when recycled aluminum is used as deoxidizers, oxides or pigments act as heat insulating materials to prevent quick melting and to hence reduce the deoxidation yield due to the oxidation of deoxidizing materials that contact air. The process according to this invention, however, allows aluminum compacts to become equivalent to melted aluminum.

D. Fourth step

In the fourth step, the small aluminum pieces processed during the third step are press molded into, for example, cylindrical forms, which are then piled up and molded so as to be subsequently transferred and processed easily. The processing method according to this invention enables the provision of aluminum compacts with a melting characteristic equivalent to that of melted aluminum. The processing according to an embodiment of this invention increases the yield of aluminum by 10% compared to conventional melting methods.

As a result, this invention has the following advantages.

1. The mixture of impurities (in particular, titanium) during re-melting can be prevented to enable easy recycling of aluminum cans.
2. The absence of oxides during melting enables the melting yield to be substantially improved.
3. When recycled aluminum is used as deoxidizers, quality equivalent to that of melted aluminum can be obtained without the use of melting methods.

As described above, this invention significantly contributes to the effective use of aluminum resources that require a large amount of energy costs as well as the efficient processing of wastes.

DETAILED DESCRIPTION OF THE PREFERRED EMBODIMENT (Embodiment 1)

Figure 1:
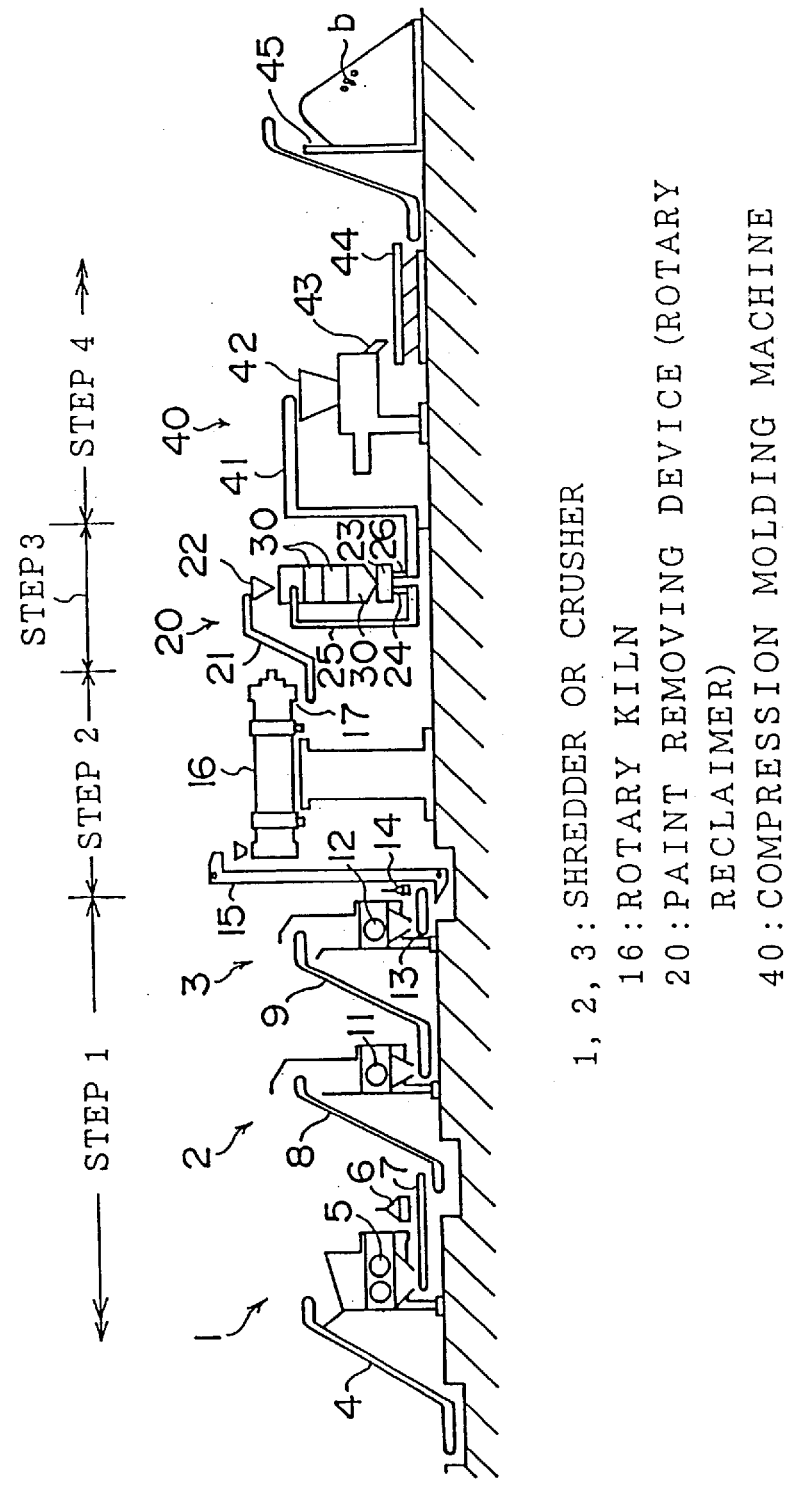
FIG. 1 is a schematic drawing of a facility to which an embodiment of this invention is applicable.

FIG. 1 shows the outline of a facility to which an embodiment of this invention is applicable.

In FIG. 1, reference numerals 1, 2, and 3 designate three shredders (or crushers) configured as three stages referred to as primary to tertiary stages. Reference numeral 4 denotes a conveyor for transportation to the shredder 1; 5 is a double shredding shaft; 6 is a separator;

and 7 is a sieve. The conveyor 4 transfers pressed blocks of aluminum cans to the shredder 1, and the separator 6 separates magnetic materials such as iron from an aggregate of aluminum can chips, using the magnetic action of the materials.

Reference numerals 8 and 9 indicate conveyors to the shredders 2 and 3; 11 and 12 are single shredding shafts; 13 is a sieve provided in the tertiary shredder 3; and 14 is a separator. The shredding shafts 11 and 12 have a cutter on their outer circumference to shred stepwise aluminum can chips transferred from the preceding stage. The sieves 7 and 13 sequentially screen the shredded aluminum can chips. Reference numeral 15 designates a bucket elevator; 16 is a rotary kiln; and 17 is an outlet.

Reference numeral 20 denotes a paint removing device. The paint removing device 20 peels and removes paints attached to the transferred small aluminum pieces in the respective corners of a rotating drum and an annular rack stationarily surrounding the drum using frictional force caused by the difference in speed between a layer of small pieces accumulated due to self lining action and flowing aluminum pieces. A device called a "rotary reclaimer" described in, for example, Japanese Patent Publication 5-742411 is applied to the paint removing device 15. Reference numeral 21 indicates a conveyor to the paint removing device 20; 22 is a hopper; 23 is a magnetic separator; 24 is a return port; 25 is a bucket elevator; and 25 is a discharge port.

Figure 2:
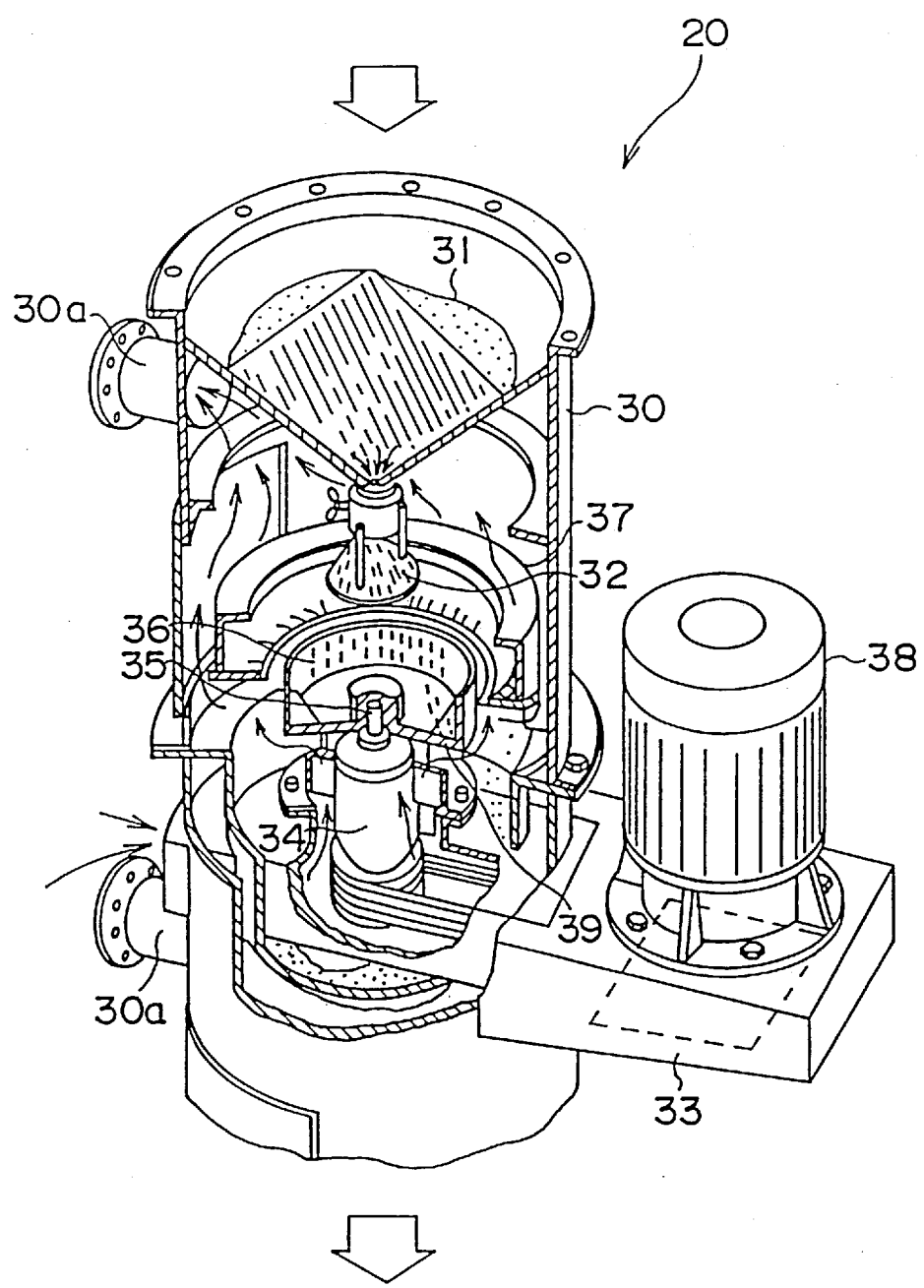
FIG. 2 is a cross section showing the internal structure of a paint removing device according to the embodiment of this invention.
Figure 3:
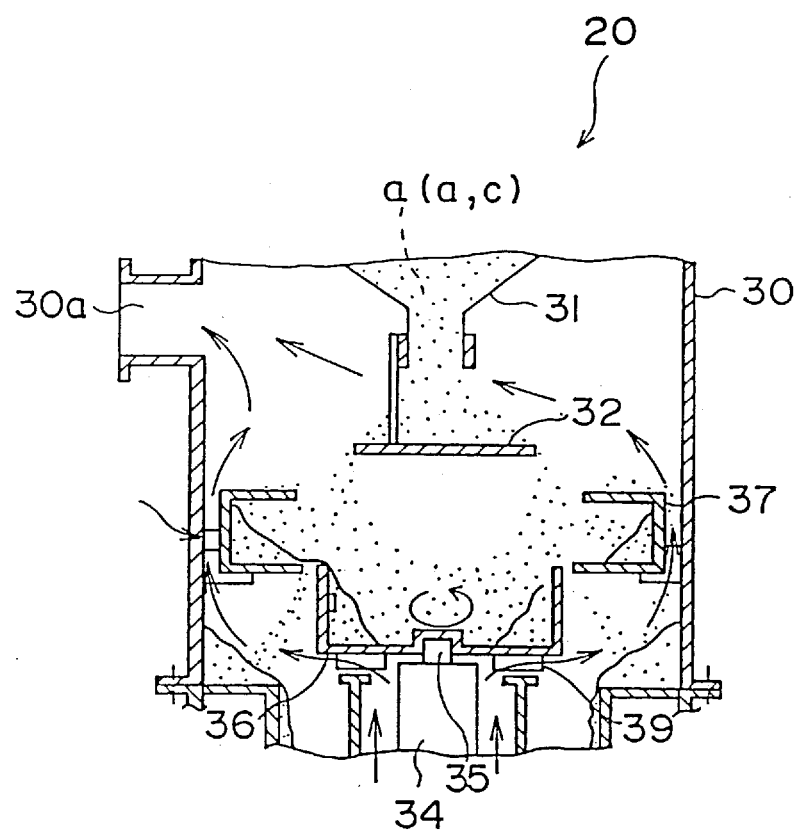
FIG. 3 is an enlarged view of part of FIG. 2.

FIG. 2 specifically shows the internal structure of the paint removing device 20, and FIG. 3 shows an enlarged view of part of FIG. 2.

In FIGS. 2 and 3, 30 is a cylindrical main body; 30a is a dust suction port; 31 is an internal hopper; 32 is a distributor; and 33 is suction pipe. The suction pipe 33 is shaped like a duct, and disposed so as to penetrate the main body 30. Reference numeral 34 designates a bearing case fixed inside the rising portion of the suction pipe 33; 35 is a rotation shaft; 36 is a rotating drum; 37 is an annular rack; and 38 is a motor. A radial fan blade 39 is provided on the bottom face of the rotating drum 36, and linked with the motor 38 via the rotating shaft 35 driven by a V belt suspended in the suction pipe 33. The main body 30 has a multi-stage structure.

Reference numeral 40 in FIG. 1 denotes a compression molding machine; 41 is a conveyor to the compression molding machine 40; 42 is a hopper; 43 is a discharge port; 44 is a conveyor; and 45 is a retaining wall; (a) is small aluminum pieces; (b) is a compact formed by compressing and molding the small aluminum pieces; and (c) is a friction medium or friction media such as a casting grid which is used for the paint removing device 20. The conveyor 41 transfers the small aluminum pieces (a) to the compression molding machine 40, while the conveyor 44 transfers the compact (b) from the compression molding machine 40.

The operation of the embodiment of this invention with the above configuration is described with reference to FIGS. 4 to 11 and Tables 1 to 3 starting with the first step.

A. First step

The main purpose of the first step is to allow subsequent steps to be effectively executed.

In the first step, the three shredders 1, 2, and 3 shown in FIG. 1 are used to shred pressed blocks of empty aluminum cans, and the pressed blocks are finally cut into small pieces, for example, 10×10 mm or smaller in size, from which mixed foreign matter is removed. First, the primary shredder 1 with the double shredding shaft 5 shreds, for example, 800×400×200 mm pressed blocks transferred via the first material supply conveyor 4, into units of a size equal to a single can by means of the rotation of the shredding shaft 5. After shredding, the separator 6 separates iron cans and chips from the aluminum pieces.

Next, the shredded aluminum cans transferred from the second material supply conveyor 9 are cut into small pieces (a) of about 50 mm squares by the shredding shaft 11 having a cutter on its outer circumferential surface and rotating at a low or medium speed. The small aluminum pieces (a) that have been cut are screened by a sieve with large meshes, for example, 50 mm in diameter which is provided below the shredding shaft. The small aluminum pieces (a) that have passed through the secondary shredder 2 are transferred to the shredder 3 via the conveyor 9, further shredded by the similar shredding shaft 12 with a cutter, and fed into a sieve 13 with meshes, for example, 10 mm in diameter. The separator 14 removes small iron pieces again to finally obtain small uniform aluminum pieces (a) of 10 mm or smaller squares.

Figure 4:
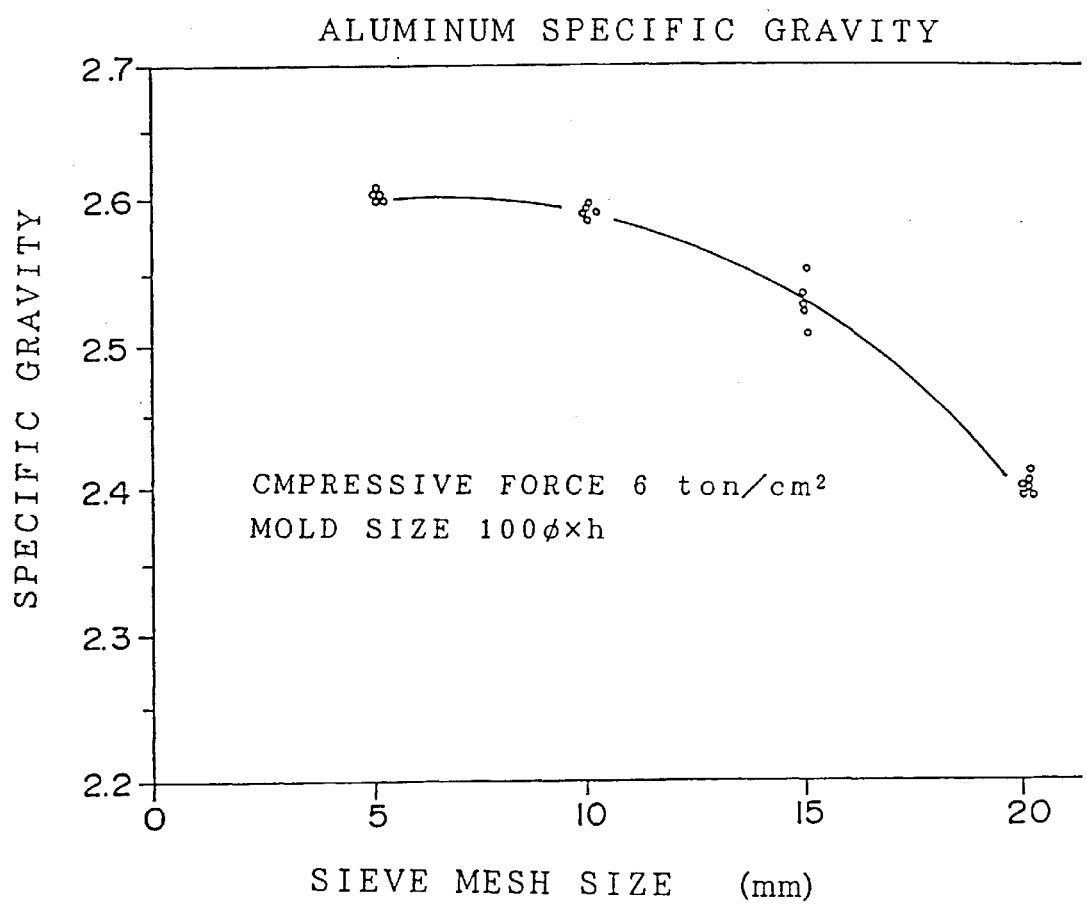
FIG. 4 is a characteristic drawing showing the relationship between the size and specific gravity of an aluminum compact.

FIG. 4 shows on the vertical axis, the specific gravity of the aluminum compact (b) and on the horizontal axis, the axis, the size (mm) of the small aluminum pieces (a) that have been subjected to final cutting, wherein the specific gravity was measured by switching the mesh size of the sieve 12 for final cutting (the tertiary shredder 3) among 5, 10, 15, and 20 mm, and roasting the small aluminum pieces (a) obtained by the sieve 12 each time the mesh size is switched, in order to mold them into compacts 100 mm in diameter (φ) under compressive force of 6 tons/cm². When the mesh size of 20 mm was used, the specific gravity of the aluminum compact (b) was 2.4, while when the mesh size of 10 mm was used, it was 2.6. With a much smaller mesh size, the specific gravity was almost saturated. It has thus been shown that aluminum compacts (b) of a higher specific gravity can be obtained by selecting a final cutting size of 10 mm or smaller.

Figure 5:
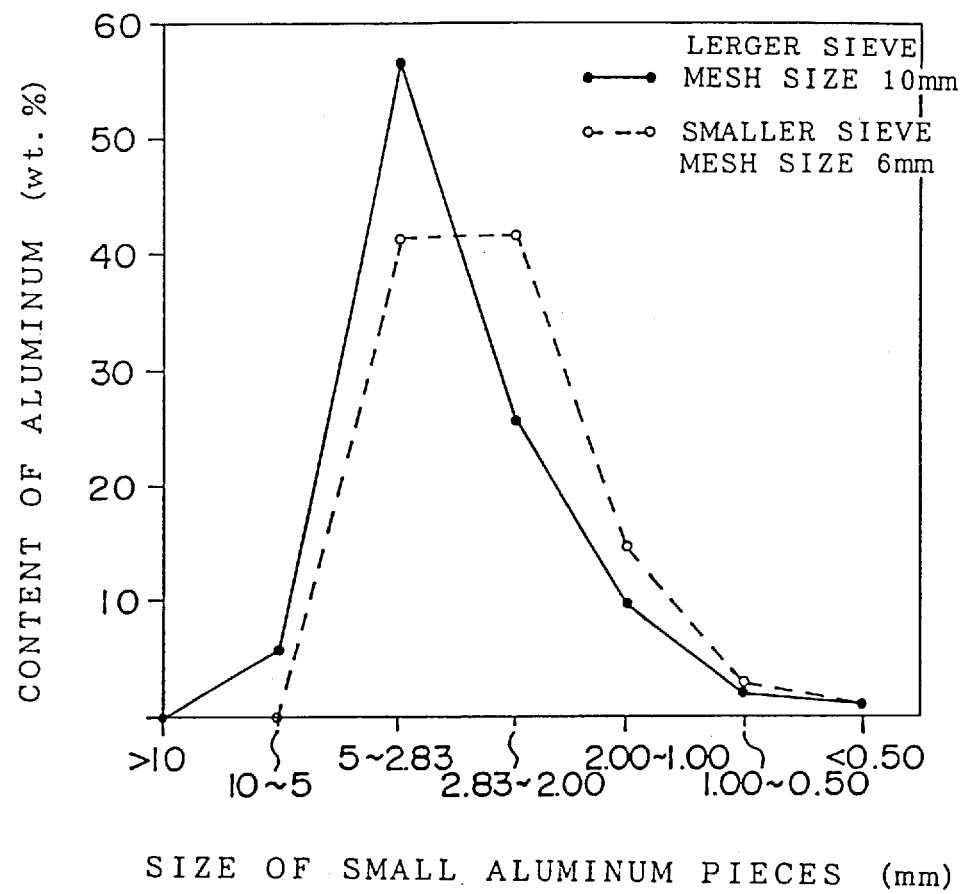
FIG. 5 explains the distribution of the size (the grain size) of small aluminum pieces.

On the other hand, if aluminum fines are generated during the processing steps, dust explosion may occur. Every effort can thus be made to prevent the generation of fines. FIG. 5 shows the content of aluminum (wt %) on the vertical axis and the size of the small aluminum piece (mm) on the horizontal axis. It shows the distribution of the sizes of the small aluminum pieces (a) obtained using the mesh size of 6 and 10 mm. As apparent from this figure, the mesh size of 6 and 10 mm hinders the generation of fines 0.5 mm or smaller in grain size. As shown in Table 1 below, since fines 0.5 mm or smaller in grain size tend to contain substances other than aluminum, there are few opportunities for dust explosion due to aluminum fines. In addition, as is apparent from FIG. 5 and Table 1, the content of aluminum is large when the grain size is within the range of 5 to 2 mm, whereas it is small when the grain size is smaller than 2 mm.

As described above, the mesh size for the final cutting (the tertiary shredder 3) during the second step, that is, the size of the small aluminum pieces (a) is preferably 10 mm or smaller, most preferably, 3 to 6 mm (squares).

TABLE 1

| Unit size of sample (mm) | (wt %) | | | |
|---|---|---|---|---|
| | Sol Al | Insol Al | Fe | SiO₂ |
| 5.00–2.83 | 97.50 | 0.17 | 0.33 | |
| 2.83–2.00 | 97.70 | 0.06 | 0.32 | |
| 2.00–1.00 | 95.90 | 0.04 | 1.83 | |
| 1.00–0.50 | 94.86 | 0.20 | 0.92 | |
| <0.50 | 32.19 | 0.20 | 2.49 | 57.60 |

Sol Al: EDTA-Zn back titration method
Insol Al: Atomic absorption method
Fe: Atomic absorption method
SiO₂: Gravimetric method B. Second step In the second step, the small aluminum pieces (a) processed during the first step are heated at a heating temperature lower than a melting point (about 600° C.) to burn attached water and inflammable foreign matter and paints.

The small aluminum pieces (a) that have been cut by the third shredder 3 during the first step so as to be 10 mm or smaller in grain size and then subjected to predetermined processing are transferred to the rotary kiln 16 by the bucket elevator 15, roasted at a heating temperature lower than a melting point in order to burn paints and inflammable foreign matter attached to the aluminum pieces (a).

The objective and effect of setting this step after the shredding in the first step are to recover the components of aluminum processed and hardened due to pressing, crushing, or cutting in order to increase the specific gravity of products obtained after subsequent molding. If this roasting step is carried out before the first step, the components of aluminum processed and hardened by shearing stress will not recover. The presence of the roasting during the second step significantly affects the processing conditions and effects of the subsequent third and fourth steps.

Figure 6:
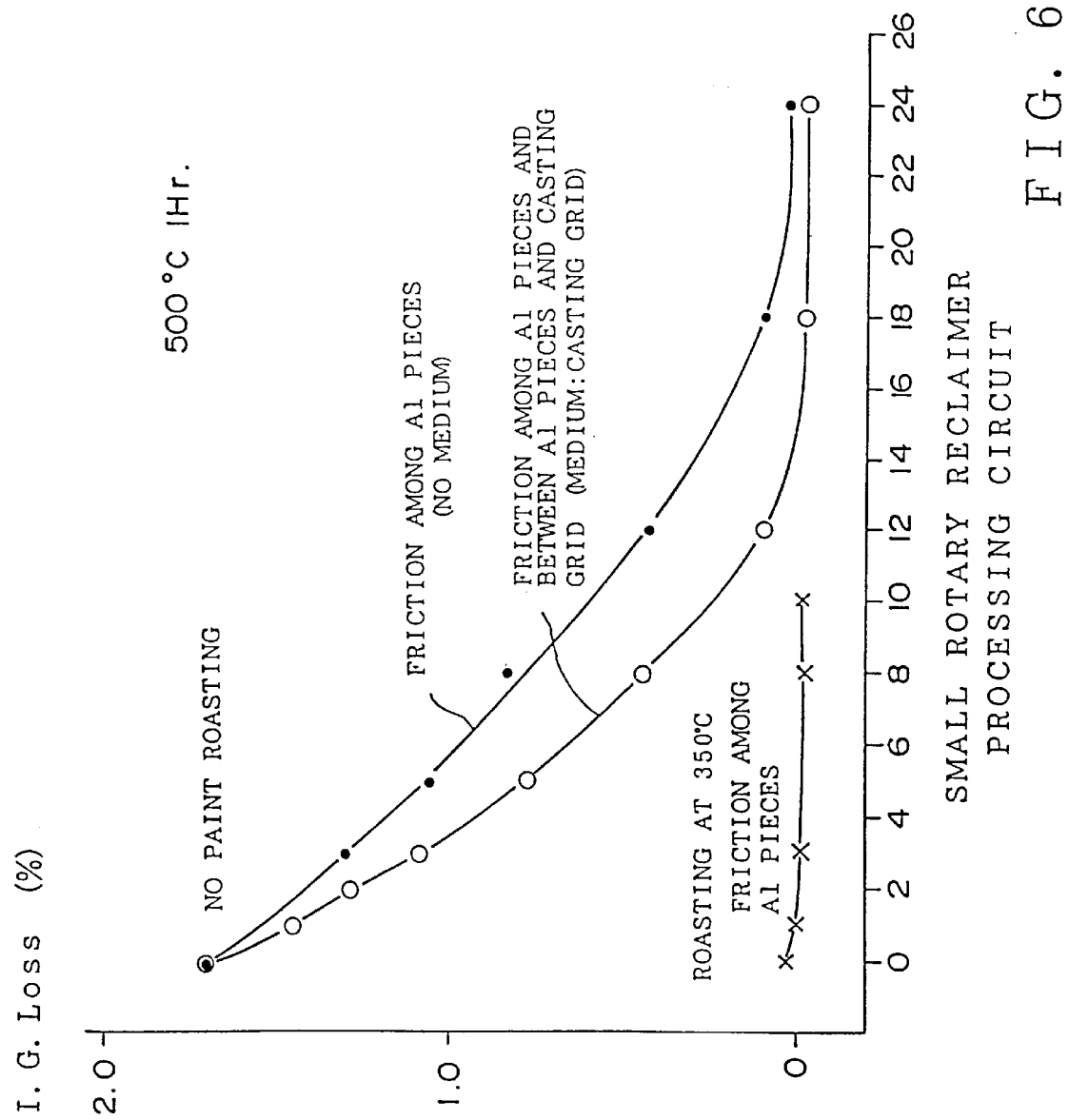
FIG. 6 is a characteristic drawing showing the effect of a second step on subsequent steps.

FIG. 6 is a characteristic drawing showing the effect of the presence of the above roasting step on the subsequent steps. The horizontal axis shows the number of operations N during the third step described below, while the vertical axis comprises graduations indicating the amount of residual paints. The amount of residual paints is shown in terms of the ignition loss when the small aluminum pieces are retained at 500° C. for one hour. If the second step is omitted or only water or foreign matter is removed, the number of operations must be increased and expensive devices must be used during the third step despite reduced costs for the roasting device. Part of this ignition loss curve contains a negative value, and this is due to the oxidation of aluminum surfaces caused by heating in the air.

Figure 7:
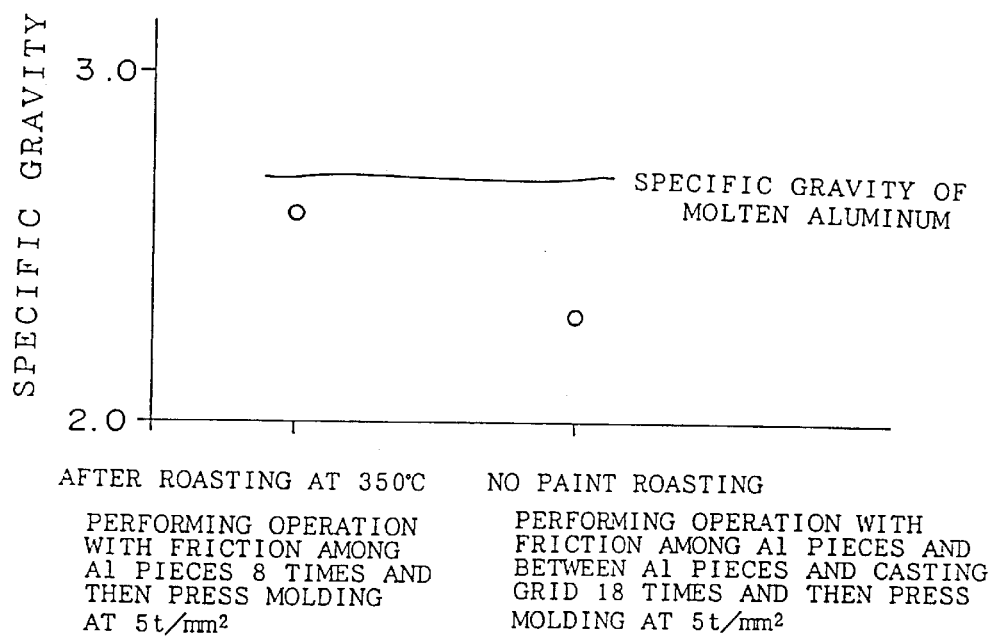
FIG. 7 explains the correlation between the processing during the second step and the specific gravity of an aluminum compact during a fourth step.

FIG. 7 shows the correlationship between the presence of roasting in the second step and the specific gravity of the aluminum compact (b) processed by the compression molding machine during the fourth step.

If the second step is omitted, resultant compacts cannot be deformed easily due to the components of aluminum processed and hardened owing to pressing, crushing, or cutting, resulting in a reduced specific gravity after pressing.

Consequently, pressed products are likely to be damaged or broken, so special attention must be paid during their transportation. Small aluminum pieces may also surface over melts, leading to an increase in oxidation losses.

Thus, the second step is preferably implemented from an industrial point of view. Fuels required for roasting can be almost compensated for by efficiently using heat obtained when paints are burned. Self roasting tests conducted by the inventors show that self roasting is possible and that the self roasting can increase the temperature up to about 430° C.

C. Third step In the third step, the small aluminum pieces (a) are fed solely or together with friction media (c) to cause a friction among the aluminum pieces (a) or between the aluminum pieces (a) and the friction media (c), thereby peeling and removing paints and pigments. The third step is carried out in the paint removing device 20 shown in enlarged views in FIGS. 2 and 3 for Embodiment 1. The paint removing device 20 is also used as a molding sand recycling device, as described in Japanese Patent Publication No. 57-42411.

The small aluminum pieces (a) that have been roasted during the second step are fed into the paint removing device 20 (hereafter referred to as a "rotary reclaimer") through the conveyor 21 via the hopper 42. The small aluminum pieces (a) fall from the internal hopper 31, and are uniformly fed like a cylindrical curtain toward the rotating drum 36 by the distributor 32. The small aluminum pieces (a) that have already been supplied stick to the inner wall of the rotating drum 36 due to centrifugal force to form a self lining layer. There is thus a difference in speed between the small aluminum pieces (a) sticking to the surface of the sedimentary layer and other aluminum pieces supplied later, and as a result, paints on the surfaces of the small aluminum pieces are peeled by friction.

The small aluminum pieces (a) overflowing the upper end of the rotating drum 36 are subjected to strong centrifugal force and fly around at a high speed. The annular rack 37 is disposed around the rotating drum, and the small aluminum pieces (a) that have already flown around are accumulated on the annular rack 37 to form a self lining layer thereon. The pressing force effected between those small aluminum pieces (a) flying from the rotating drum 36 and other aluminum pieces (a) accumulated in the sedimentary layer thus serves to further peel paint residue on their surfaces.

That is, the aggregate of small aluminum pieces (a) processed in the second step is fed into the rotary reclaimer 20, where it is rotated and agitated at a high speed by the rotating drum 36. A sedimentary layer of small aluminum pieces (a) is formed on both the rotating drum 36 rotating at a high speed and the stationary annular rack 37, while the interaction of the difference in speed between the inner and outer circumferential aluminum pieces and pressing force applied to the small aluminum pieces (a) by centrifugal force causes foreign matter on the surfaces of the aluminum pieces (a) to be peeled and effectively removed.

Fines containing peeled and separated paints are forcefully separated from the small aluminum pieces by air blown from the fan blade 39 integrated with the rotating drum 36, and soaring fines are sucked by the dust suction port 30a and then captured by an external dust catcher. At the same time, the small aluminum pieces (a) remaining in the main body 30 are fed from the lower discharge port into the internal hopper 31 in the second stage. In this manner, the similar cyclic peeling operation of the rotary reclaimer 20 of a multi-stage structure allows paint residue coated on the surfaces of the small aluminum pieces (a) to be almost completely removed.

In the mechanical rotary claimer 20 in the third step, friction media (c) are mixed in the aggregate of small aluminum pieces (a) to improve the removal efficiency. If a casting grid is used as a friction medium (c), the magnet separator 23 separates the small aluminum pieces (a) from the friction medium (c). The friction media (c) are returned from the return port 24 through the bucket elevator 25 to the internal hopper 31, where they are reused to remove paints. The small aluminum pieces (a) that are almost free from paint residue are transferred to the fourth step via the discharge port 26.

Figure 8:
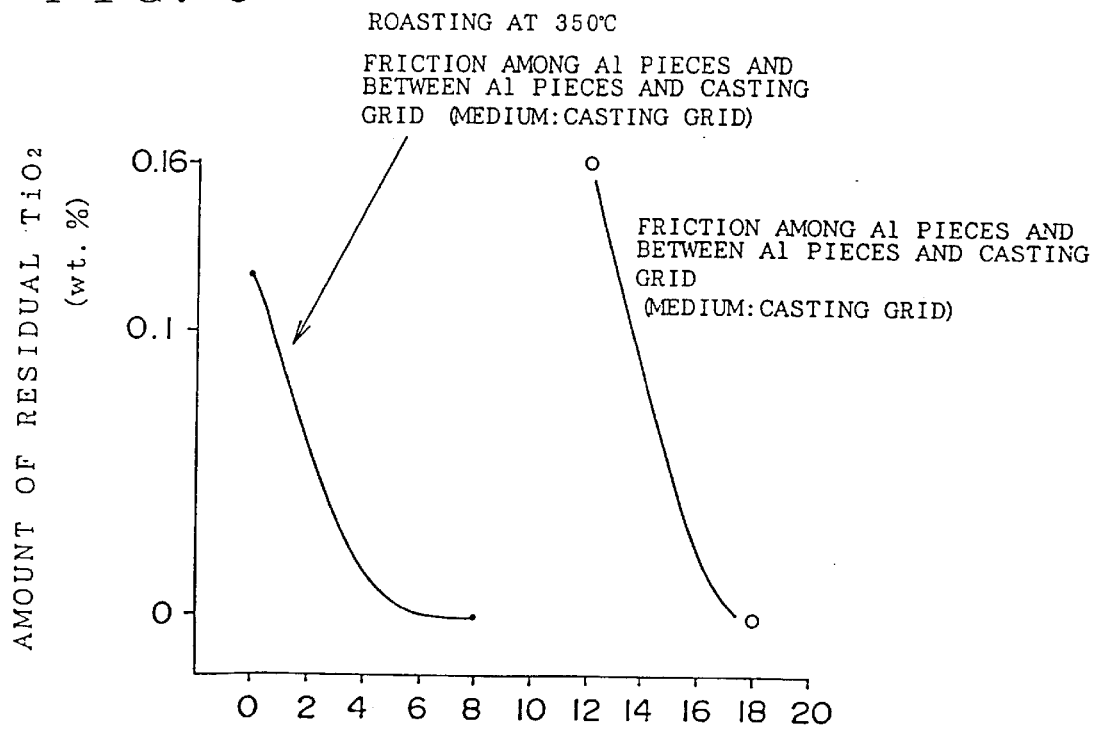
FIG. 8 is a characteristic drawing showing the relationship between the number of operations during a third step and residual $TiO_2$.

FIG. 8 shows the relationship between the number of operations N during the third step and residual $TiO_2$. This figure indicates that residual $TiO_2$ can be almost completely removed from the small aluminum pieces (a) roasted at 350° C. during the second step by carrying out operation six times even if the friction media (c) are not used during the third step. It has conventionally been difficult to recycle used aluminum cans as new ones because Ti reduced during melting process adversely effects during sheet rolling and can processing. The processing employing the rotary reclaimer 20, however, enables recycling. In addition, when recycled aluminum is used as deoxidizers, oxides or pigments act as heat insulating materials to prevent quick melting and to hence reduce the deoxidation yield due to the oxidation of deoxidizing materials that contact air. The processing according to this invention, however, allows aluminum compacts to become equivalent to melted aluminum.

D. Fourth step

The fourth step molds the small aluminum pieces (a) processed during the third process so that they can be used easily during subsequent steps.

The small aluminum pieces (a) processed during the third step are fed via the conveyor 41 into the hopper 42 in the conveyor 41 shown in FIG. 1, where they are press molded into cylindrical forms 5φ×3 (mm) in size under compressing force of 3 tons/cm$^2$ or higher. After press molding, the aluminum compacts (b) are discharged from the discharge port 43, and transferred via the conveyor 44 to the retaining wall 45, where they are piled up.

Figure 9:
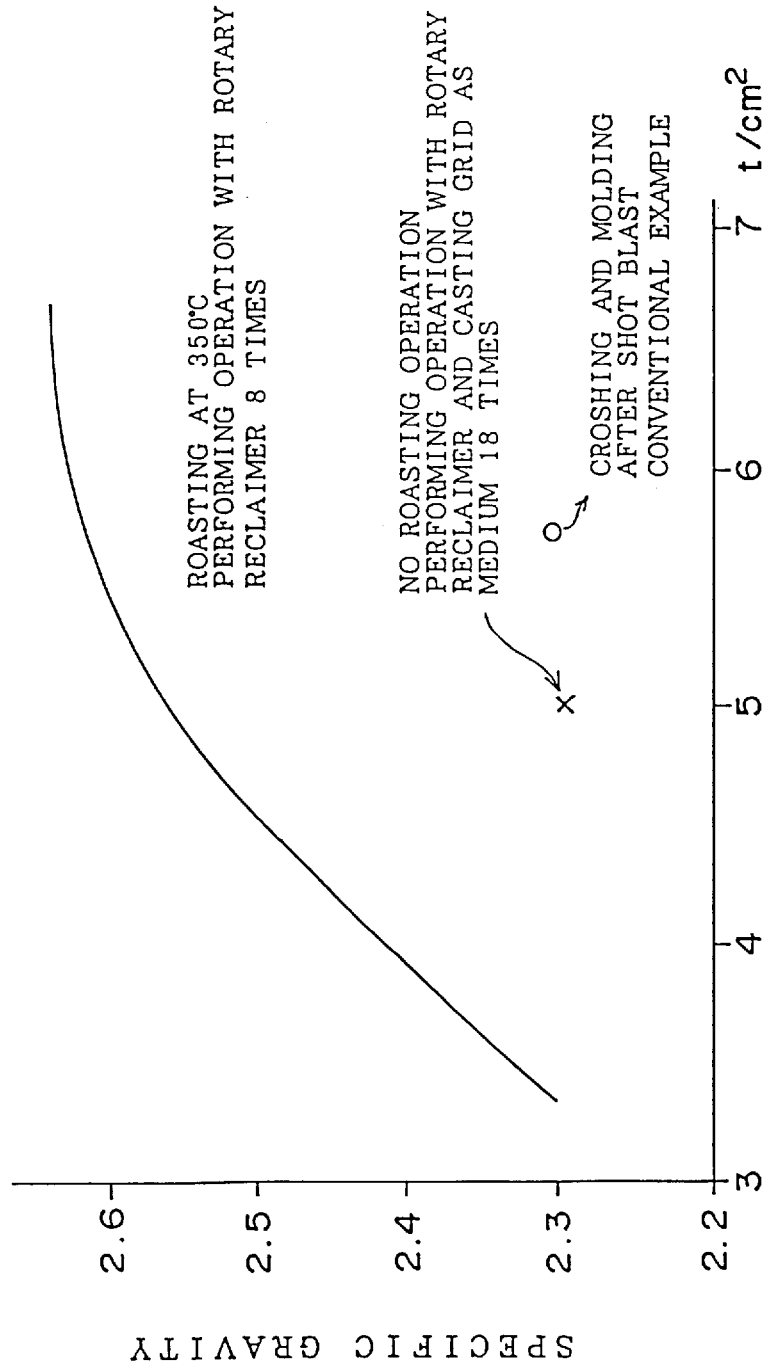
FIG. 9 describes the relationship between the pressure during the fourth step and the specific gravity of a pressed compact.

FIG. 9 shows the relationship between the pressure and the specific gravity of the pressed compact (b). The specific gravity required for the object to be recycled should be selected, but press molding is preferably executed under a pressure of 4 tons/cm$^2$ or higher. It can be assumed that the paint removing method shown in this embodiment minimizes hardening during processing.

Table 2 shows the analysis values for the components of the aluminum compact (b). This invention significantly reduces impurities compared to conventional pressed products. According to the invention, the total amount of Al, Mn, and Mg contained in an empty aluminum can accounts for 99.63% of the total amount of the can.

TABLE 2

| | (wt %) | | | | | | |
|---|---|---|---|---|---|---|---|
| | Sol Al | Insol Al | Mn | Mg | SiO$_2$ | Fe | Ti |
| Conventional products | 94.57 | 0.05 | 0.89 | 1.91 | 0.17 | 0.64 | 0.12 |
| Products obtained according to this invention | 97.10 | 0.007 | 0.86 | 1.67 | tr | 0.30 | tr |

TABLE 3

| No. | Contents | Degree of melting | Specific gravity |
|-----|----------|-------------------|------------------|
| 1 | Melted aluminum (standard product) | ◉ | 2.7 |
| 2 | Shredding, roasting, and then pressing conventional product. | X | 2.6 |
| 3 | Aluminum sheet (A1050 0.1 mm). Shredding and then pressing new product. | ◉ | 2.7 |
| 4 | Shredding and then pressing UBC shot blast product. | X | 2.4 |
| 5 | Shredding and roasting UBC, mixing aluminum chips and casting grid together at the ratio of 1 to 1 in weight, performing operation with S type rotary reclaimer 8 times, and finally pressing. | ◉ | 2.6 |
| 6 | Shredding and roasting UBC, performing operation with S type rotary reclaimer 12 times, and then pressing. | ○ | 2.6 |
| 7 | Shredding and roasting UBC, mixing aluminum chips and sand together at the ratio of 3 to 2 in volume, performing operation with S type rotary reclaimer 5 times, and finally pressing. | X | 2.6 |

Table 3 shows the results of the observation of various samples loaded on molten steel in an induction heater under the assumption that they will be used as deoxidizing materials. The processing method according to this invention can provide aluminum compacts (b) with a melting characteristic equivalent to that of melted aluminum.

When the amount of small aluminum pieces (a) supplied during the first step was assumed to be 100%, the total yield of metal Al, Mn, and Mg from the process according to the embodiment of this invention was 94.2% because paints decreased by about 1.8% (moisture: 0.1%; paints burned: 1.7%) after the burning processing in the second step and further by 4.0% after the third step. The yield has increased by 9.2 compared to 85% in conventional melting methods.

(Embodiment 2)

Figure 10:
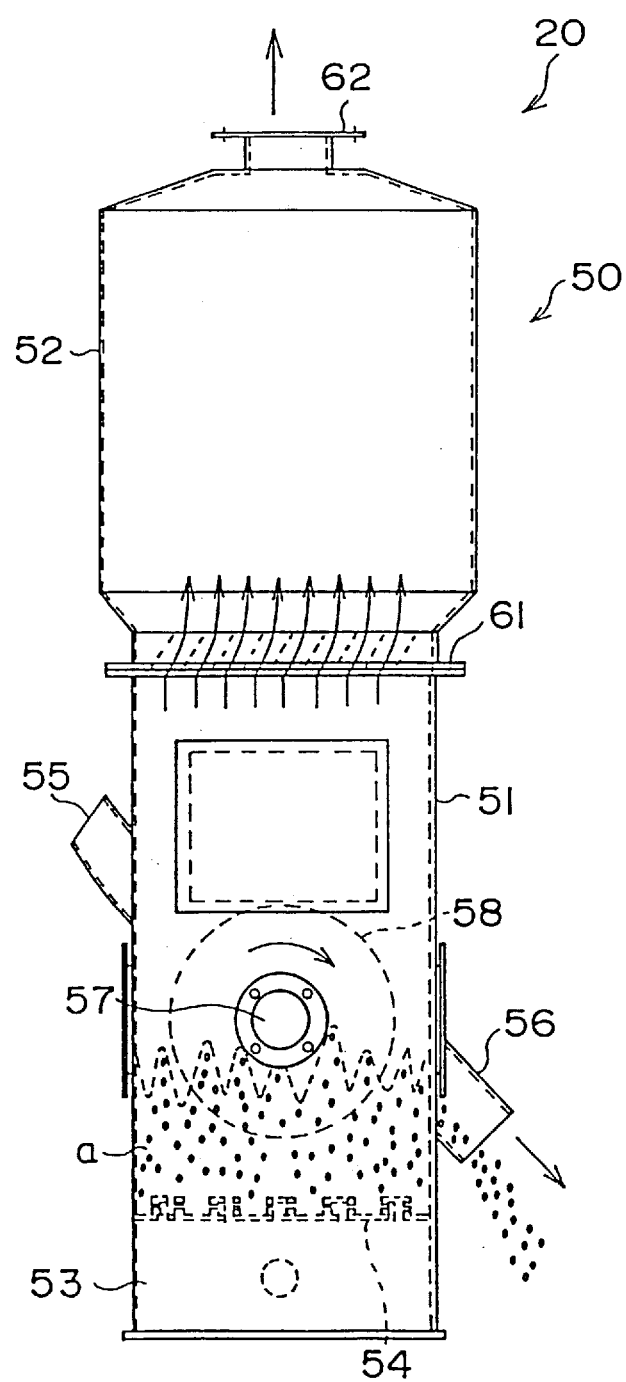
FIG. 10 describes the configuration of another embodiment of the paint removing device.
Figure 11:
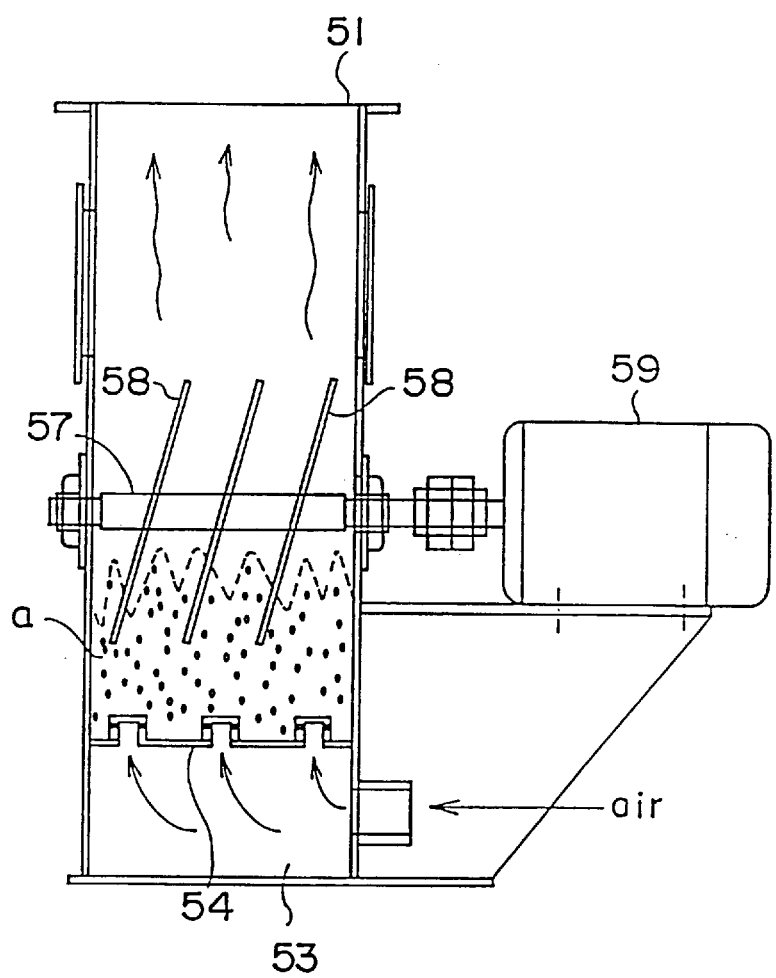
FIG. 11 is a side cross section of part of FIG. 10.
Figure 12:
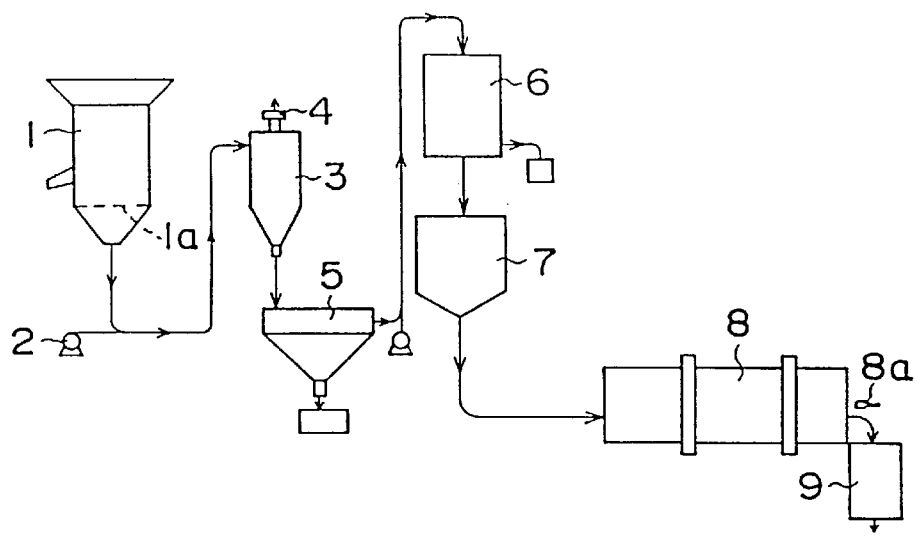
FIG. 12 explains an example of conventional processing method.
Figure 13:
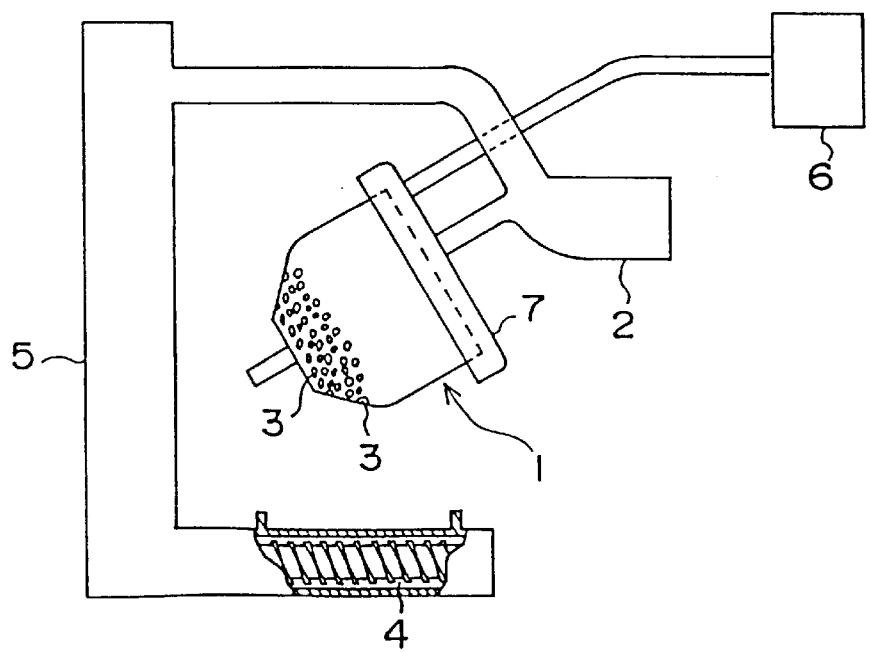
FIG. 13 describes the outline of a conventional brass shot device.

FIG. 10 describes the configuration of another embodiment of the paint removing device, and FIG. 11 is a side cross section of part of FIG. 10.

In FIGS. 10 and 11, 50 is a main body. The main body 50 has a two-stage structure, and comprises an agitating vessel 51 and a classifying vessel 52. Reference numeral 53 is a blowing chamber; 54 is a fluidized bed; 55 and 56 are an incoming pipe and an outgoing pipe, respectively; 57 is a drive shaft; and 58 is an oscillating plate. The oscillating plate 58 is fixed to the drive shaft 57 so as to be inclined relative to this shaft, as shown in FIG. 11. The surfaces of the three oscillating plates 58 are made rough using a grindstone. Reference numeral 59 denotes a motor; 61 is a regulating plate; and 62 is an exhaust port. The regulating plate 61 is provided between the agitating vessel 51 and the classifying vessel 52 so as to allow both vessels to communicate with each other.

In the paint removing device 20 of this configuration, the small aluminum pieces (a) processed during the second step are fed into the agitating vessel 51 from the incoming pipe 55. When the motor 59 drives the drive shaft 57, the three oscillating plates 58 buried under the small aluminum pieces (a) fed into the agitating vessel 51 starts oscillation. Air from a blower is supplied via a blowing port to the blowing chamber 53, and strong pressurized air is blown into the agitating vessel 51 through the fluidized bed 54 to allow the small aluminum pieces (a) to flow and to agitate them. As a result, direct polishing by the oscillating plates 58 and indirect contact by the agitation serve to peel paints from the surfaces of the small aluminum pieces (a).

The peeling of paints in the agitating vessel 51 progresses according to the cooperative operations of the oscillating plates 58 and the flowing aluminum pieces (a). As the peeling operation progresses, air is blown out among the small aluminum pieces (a) flowing in the agitating vessel 51, thereby passing fine paints separated from the aluminum pieces (a), through the regulating plate 61 into the classifying vessel 52. The fines fed into the classifying vessel 52 and containing paints are sequentially captured by the dust catcher (not shown) through the exhaust port. The small aluminum pieces (a) free from paints are transferred to the fourth step via the outgoing pipe 56, as described above.

According to Embodiment 2 of this invention, given power can be effectively used to prevent the breakage of the small aluminum pieces (a) as in the rotary reclaimer in Embodiment 1, thereby effectively removing attached paints.

In the above embodiments, the step for heating the small aluminum pieces to burn inflammable foreign matter can be omitted. The step for compressing the small aluminum pieces into metal masses can also be omitted if the bulk specific gravity can be ignored, if the aluminum pieces can be prevented from surfacing over the surface of melts or slag and being then oxidized during melting, or if such oxidation can be ignored.

Although this invention has been illustrated in conjunction with the use of a double shaft shredder as the primary shredder 1, this may be replaced by a hammer crusher. If empty aluminum cans are directly used without being processed into pressed blocks, the shredding by the shredder 1 can be omitted. The tertiary shredder 3 can also be used to directly cut aluminum chips into small pieces of a predetermined size without using the secondary shredder 2. In this embodiment, however, the secondary shredder 2 is installed between the primary and tertiary shredders to improve production capacity.

We claim:

1. An aluminum can recycling method comprising:

a first step comprising cutting empty aluminum cans into small pieces of 10 mm squares or less and removing foreign matter mixed in an aggregate of the small pieces;

a second step comprising heating said aggregate of small aluminum pieces processed during said first step at a heating temperature lower than the melting point in order to burn inflammable foreign matter; and a third step for peeling paints and oxides from surfaces of the small aluminum pieces in an agitating vessel that includes both a rotating drum, comprising a container surrounded by a wall, and a stationary annular rack disposed above and around said rotating drum, said third step comprising feeding the small aluminum pieces into the agitating vessel and rotating the drum at sufficiently high speed so as to cause friction between a first portion of the small aluminum pieces that are fed into the agitating vessel and are accumulated by centrifugal force on a surface of the rotating drum or a surface of the annular rack and a second portion of the small aluminum pieces that are fed into the agitating vessel and are not accumulated on the surface of the rotating drum or the surface of the annular rack, said friction causing peeling of said paints and oxides from the surfaces of the small aluminum pieces.

2. An aluminum can recycling method according to claim 1 wherein in said first step, small aluminum pieces are cut into 3 to 6 mm squares.

3. An aluminum can recycling method according to claim 1 wherein in said third step, plural units of the agitating vessel are connected in order to repeat said third step a plurality of times.

4. An aluminum can recycling method according to claim 1 wherein in said third step, friction media are mixed with the small aluminum pieces that are fed into the agitating vessel.

5. An aluminum can recycling method according to claim 1, further comprising a fourth step for compressing the aggregate of small aluminum pieces processed during said third step in order to mold the same into a metal mass.

6. An aluminum can recycling method according to claim 5 wherein in said fourth step, said aggregate of small aluminum pieces is compressed at a pressure of at least 4 ton cm$^2$ in order to mold the same into a metal mass.

7. An aluminum can recycling apparatus comprising:

a shredding means for cutting empty aluminum cans into small pieces of 10 mm squares or less and removing foreign matter mixed in an aggregate of the small pieces;

a heating means for heating said aggregate of small aluminum pieces processed by said shredding means at a heating temperature lower than the melting point in order to burn inflammable foreign matter; and a paint removing device for peeling paints and oxides from surfaces of the small aluminum pieces, said paint removing device comprising an agitating vessel including a rotating drum, comprising a container surrounded by a wall, and a stationary annular rack disposed above and around said rotating drum, and means for rotating the rotating drum at a speed that is sufficiently high to cause friction between a portion of the small aluminum pieces that are fed into the agitating vessel and are accumulated by centrifugal force on a surface of the rotating drum or a surface of the annular rack and a portion of the small aluminum pieces that are fed into the agitating vessel and are not accumulated on the surface of the rotating drum or the surface of the annular rack such that the friction causes peeling of the paints and oxides from the surfaces of the small aluminum pieces.

8. An aluminum can recycling apparatus according to claim 7, further comprising a compressing means for compressing said aggregate of small aluminum pieces processed by said paint removing device in order to mold the same into a metal mass.

* * * * *